United States Patent
Wada

(10) Patent No.: US 8,472,885 B2
(45) Date of Patent: Jun. 25, 2013

(54) INFORMATION PRESENTING APPARATUS, INFORMATION PRESENTING METHOD, AND THE LIKE, FOR PERFORMING COMMUNICATION WITH A PLURALITY OF DEVICES

(75) Inventor: Yukihito Wada, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 684 days.

(21) Appl. No.: 12/445,216

(22) PCT Filed: Oct. 17, 2006

(86) PCT No.: PCT/JP2006/320650
§ 371 (c)(1),
(2), (4) Date: Apr. 10, 2009

(87) PCT Pub. No.: WO2008/047407
PCT Pub. Date: Apr. 24, 2008

(65) Prior Publication Data
US 2009/0325557 A1     Dec. 31, 2009

(51) Int. Cl.
*H04B 17/00*     (2006.01)

(52) U.S. Cl.
USPC ........ 455/67.7; 455/414.2; 455/68; 455/41.2; 455/414.1; 455/566; 345/1.2; 345/2.1; 345/2.2; 345/2.3; 340/915

(58) Field of Classification Search
USPC ............... 455/414.2, 41.2, 3.03, 3.04, 414.1, 455/566, 457, 154.2, 158.4, 158.5, 418–420; 345/1.2, 2.1, 2.2, 2.3
See application file for complete search history.

(56) References Cited

U.S. PATENT DOCUMENTS

| | | | |
|---|---|---|---|
| 6,587,756 B2 * | 7/2003 | Moriguchi et al. | 701/1 |
| 7,050,945 B2 * | 5/2006 | Oba et al. | 702/188 |
| 7,761,086 B2 * | 7/2010 | Niizato et al. | 455/414.1 |
| 7,945,785 B2 * | 5/2011 | Castaldi et al. | 713/183 |
| 2004/0051703 A1 * | 3/2004 | Taniguchi et al. | 345/204 |
| 2004/0100389 A1 * | 5/2004 | Naito et al. | 340/691.6 |
| 2005/0036509 A1 * | 2/2005 | Acharya et al. | 370/466 |
| 2005/0131953 A1 | 6/2005 | Sugiyama et al. | |
| 2008/0119222 A1 * | 5/2008 | Piekarz | 455/556.1 |

FOREIGN PATENT DOCUMENTS

| | | |
|---|---|---|
| JP | 05-189343 A | 7/1993 |
| JP | 2005-348262 A | 12/2005 |
| WO | 2004/072853 A1 | 8/2004 |

OTHER PUBLICATIONS

Takahiro Noda, et al., "GDA: A Combined or Shared Screen System Based on Several PDAs," Transactions of Information Processing Society of Japan, Oct. 15, 2003, pp. 2478-2489, vol. 44, No. 10.

* cited by examiner

*Primary Examiner* — Allahyar Kasraian
(74) *Attorney, Agent, or Firm* — Sughrue Mion, PLLC

(57) ABSTRACT

The present invention provides an information presenting apparatus, an information presenting method, and the like enabling a plural users to log in and capable of improving convenience (usability) and the like for users. The information presenting apparatus capable of performing radio communication with a plural radio communication devices includes a storage which stores setting information that specifies content or format of information to be presented to users of the radio communication devices so that the setting information for the plural radio communication devices can be distinguished from each other, a registration unit which registers the radio communication device with which radio communication is established and a presentation unit which presents the information on the basis of the setting information for the registered radio communication device.

7 Claims, 10 Drawing Sheets

FIG. 2

| IDENTIFICATION INFORMATION | SETTING INFORMATION | | | | |
|---|---|---|---|---|---|
| | DISPLAY FORMAT OF SCREEN | SOUND OUTPUT FORMAT | CONTENT OF DESTINATION LIST | CONTENT OF PLAY LIST | ...... |
| 10001 (TA) | ...... | ...... | ...... | ...... | ...... |
| 10002 (TB) | ...... | ...... | ...... | ...... | ...... |
| 10003 (TC) | ...... | ...... | ...... | ...... | ...... |
| 10001+10002 (TA+TB) | ...... | ...... | ...... | ...... | ...... |
| 10001+10003 (TA+TC) | | | ...... | | ...... |
| 10001+10002+10003 (TA+TB+TC) | ...... | | | | ...... |

| PRIORITIES | |
|---|---|
| 1 | SETTING INFORMATION COMMON TO TA(10001) AND TB(10002) |
| 2 | SETTING INFORMATION FOR TA(10001) |
| 3 | SETTING INFORMATION FOR TB(10002) |
| 4 | INITIAL(DEFAULT)SETTING INFORMATION |

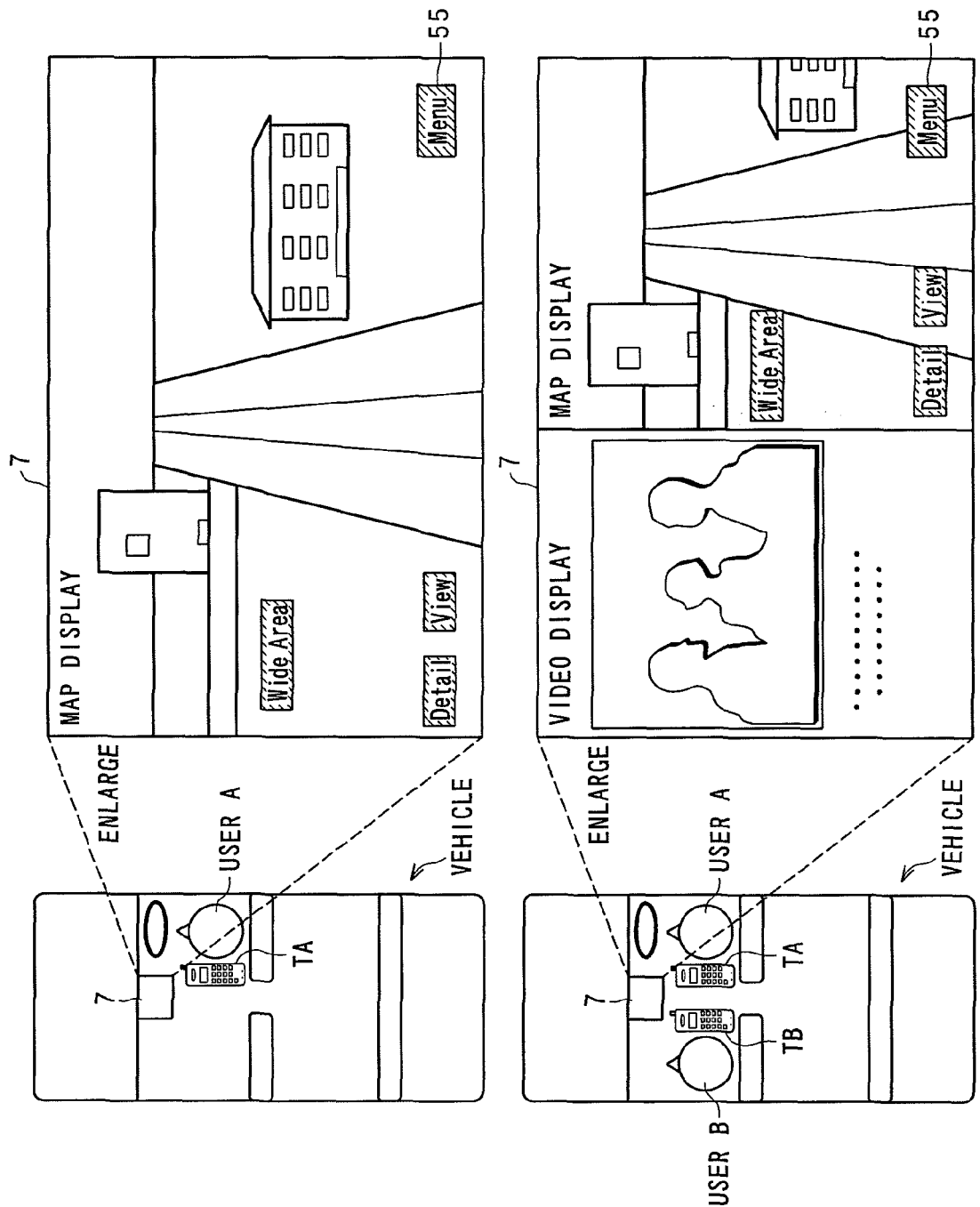

INFORMATION PRESENTING APPARATUS, INFORMATION PRESENTING METHOD, AND THE LIKE, FOR PERFORMING COMMUNICATION WITH A PLURALITY OF DEVICES

TECHNICAL FIELD

The present invention relates to the technical field of an information presenting apparatus or the like capable of performing radio communication with a plural radio communication devices.

BACKGROUND ART

Conventionally, for example, in a personal computer or the like, a number of known techniques of executing a predetermined function by an individual who logs in using an identifier (ID), a password, or the like are known. In such techniques, at the time of logging out from a computer being operated by the user, in the case where the user wishes to reproduce the present operation environment at the time of log-in of the next time, information of the present operation environment is collected and registered in to a server. At the time of login of the next time, whether the operation environment of last time has to be reproduced or not is determined. When necessary, the registered information of the operation environment is extracted and, on the basis of the information, the operation environment is reproduced (refer to, for example, patent document 1).

The content set on a computer by a specific user during login, registered information (data), and the like cannot be viewed when another user logs in (except for common data).
Patent document 1: Japanese Patent Application Laid-Open No. 05-189343

DISCLOSURE OF INVENTION

Problems to be Solved by the Invention

However, in an apparatus such as an in-vehicle navigation apparatus, an AV apparatus, or the like used by a plural users (who ride on the same vehicle) and in the time zone, when individuals log in, various inconveniences occur.

For example, it is difficult for a user who does not log in to view, use, or the like information set by himself/herself. It is also difficult for a user who does not log in to compare the information set by himself/herself with information set during login by another user.

In the case where information is shared so that the same information is presented to any of uses who log in, a problem occurs that information is mixed and not easily viewed.

As described above, the conventional technique has an inconvenience that convenience (usability) for users is low.

As an example of challenges to solve such inconveniences, an object of the present invention is to provide an information presenting apparatus, an information presenting method, and the like enabling a plural users to log in and capable of improving convenience (usability) for the users.
Means for Solving the Problems In order to solve the above problem, an exemplary non-limiting embodiment of the disclosure relates to an information presenting apparatus capable of performing radio communication with a plurality of radio communication devices, comprising:

storing means for storing setting information that specifies content or format of information to be presented to users of the radio communication devices so that the setting information for the plurality of radio communication devices can be distinguished from each other;

registering means for registering the radio communication device with which radio communication is established; and presenting means for presenting the information on the basis of the setting information for the registered radio communication device, wherein in the case where radio communication is established with the plurality of radio communication devices and the plurality of radio communication devices are registered, the presenting means presents the information on the basis of the setting information common to the radio communication devices registered.

Another exemplary non-limiting embodiment of the disclosure relates to an information presenting method capable of performing radio communication with a plurality of radio communication devices, comprising:

a storing process of storing setting information that specifies content or format of information to be presented to users of the radio communication devices so that the setting information for the plurality of radio communication devices can be distinguished from each other;

a registering process of registering the radio communication device with which radio communication is established; and a presenting process of presenting the information on the basis of the setting information for the registered radio communication device, wherein in the presenting process, in the case where radio communication is established with the plurality of radio communication devices and the plurality of radio communication devices are registered, the information is presented on the basis of the setting information common to the radio communication devices registered.

Another exemplary non-limiting embodiment of the disclosure relates to an information presentation processing program for making a computer capable of performing radio communication with a plurality of radio communication devices function as:

storing means for storing setting information that specifies content or format of information to be presented to users of the radio communication devices so that the setting information for the plurality of radio communication devices can be distinguished from each other;

registering means for registering the radio communication device with which radio communication is established; and presenting means for presenting the information on the basis of the setting information for the registered radio communication device, wherein in the case where radio communication is established with the plurality of radio communication devices and the plurality of radio communication devices are registered, the presenting means functions so as to present the information on the basis of the setting information common to the radio communication devices registered.

The information presentation processing program may be computer-readably recorded on a recording medium.

BRIEF DESCRIPTION OF DRAWINGS

FIG. 2 is a diagram showing content in a database (constructed in, for example, an HD) in which setting information is stored so as to be distinguished among radio communication devices.

FIG. 3 is a diagram showing an example of priority of setting information in the case where a radio communication device TA and a radio communication device TB log in.

FIGS. 4A and 4B are diagrams showing an example of screens displayed on a display 7 in the case where a single radio communication device logs in and in the case where a plural radio communication devices log in.

FIGS. 5A and 5B are diagrams showing an example of screens displayed on the display 7 in the case where a single radio communication device logs in and in the case where a plural radio communication devices log in.

FIGS. 6A and 6B are diagrams showing an example of screens displayed on the display 7 in the case where a single radio communication device logs in and in the case where a plural radio communication devices log in.

Figure 1:
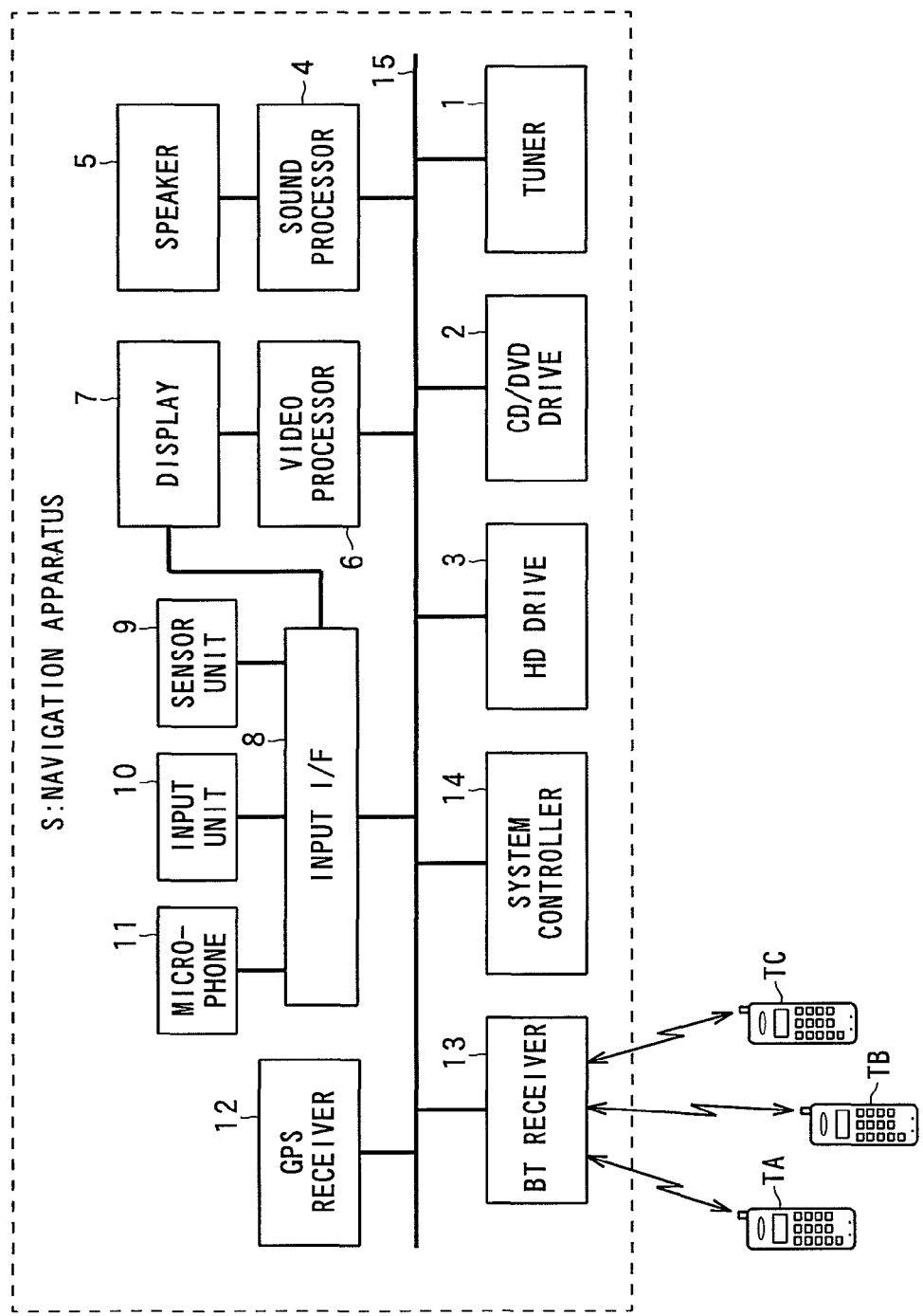
FIG. 1 is a diagram showing an example of a schematic configuration of a navigation apparatus as an embodiment of the present invention.

DESCRIPTION OF REFERENCE NUMERALS 1 tuner
2 CD/DVD drive
3 HD drive
4 sound processor
5 speaker
6 video processor
7 display
8 input I/F
9 sensor unit
10 input unit
11 microphone
12 GPS receiver
13 BT receiver
14 system controller
15 bus
S navigation apparatus
Best Modes for Carrying out the Invention Best modes for carrying out the present invention will be described below with reference to the drawings. Embodiments described below relate to the case where the present invention is applied to an in-vehicle navigation AV (Audio Visual) apparatus (hereinbelow, simply called "navigation apparatus") mounted on a vehicle.

First, with reference to FIG. 1 and the like, the configuration and functions of a navigation apparatus as an embodiment of the present invention will be described.

FIG. 1 is a diagram showing an example of a schematic configuration of the navigation apparatus as the embodiment.

A navigation apparatus S as the embodiment has, as shown in FIG. 1, a tuner 1, a CD (Compact Disc)/DVD (Digital Versatile Disc) drive 2, an HD (Hard Disk) drive 3, a sound processor 4, a speaker 5, a video processor 6, a display 7, an input I/F (interface) 8, a sensor unit 9, an input unit 10, a microphone 11, a GPS (Global Positioning System) receiver 12, a BT (Bluetooth) receiver 13, and a system controller 14. The tuner 1, CD/DVD driver 2, HD drive 3, sound processor 4, image processor 6, input I/F 8, GPS receiver 12, BT receiver 13, system controller 14, and the like are connected to a bus 15.

Under control of the system controller 14, the tuner 1 receives broadcast signals (including, for example, audio data, video data, and the like) on FM broadcast, AM broadcast, or television broadcast from a broadcast station via an antenna (not shown) and reproduces the broadcast signals.

The CD/DVD drive 2 reproduces data (for example, audio data, video data or the like) recorded on a not-shown CD or DVD (an example of a recording medium) under control of the system controller 14. An MD drive for recording and reproducing data to/from an MD (Mini Disc) may be provided for the navigation apparatus S.

Under control of the system controller 14, the HD drive 3 as an example of storing means records (writes) or reproduces (reads) data to/from a not-shown HD (an example of the recording medium). In an HD, a program on control on the entire navigation apparatus S (including a program related to a navigation (path search, routing assistance (path guidance), or the like) function, a program related to the audio recording/reproducing function and a video recording/reproducing function, an information presenting program of the invention, and the like) and various data (text data, screen data, map data, and the like) are recorded. The program may be stored, for example, in a predetermined server connected to a communication network including the Internet, a mobile communication network (including a radio base station) and the like and provided from the server via a communication unit (not shown). Alternatively, the program may be recorded on a recording medium such as a CD-ROM and provided (read) from the recording medium via the CD/DVD drive 2.

The HD drive 3 can record the audio data (for example, music piece data), video data, and the like reproduced by the CD/DVD drive 2 to an HD under control of the system controller 14. Further, the HD drive 3 stores setting information that specifies content or format of information to be presented to the user (for example, sound output from the speaker 5 or display output to the display 7) to an HD under control of the system controller 14 (the details will be described later).

The sound processor 4 has a D (Digital)/A (analog) converter, an amplifier (not shown), and the like. For example, the sound processor 4 converts audio data reproduced and output from the CD/DVD drive 2 and the HD drive 3 to an analog signal, amplifies it, and outputs the amplified signal to the speaker 5. In such a manner, sound waves are output (amplified) from the speaker 5. A plural speakers 5 are mounted, for example, in a vehicle (for example, in five places in a vehicle). The speakers 5 include a woofer and a subwoofer of bass audio frequencies.

The image processor 6 has a buffer memory (not shown) such as a VRAM (Video Random Access Memory) or the like for temporarily storing display data (for example, video data, screen data, or the like reproduced and output from the tuner 1, CD/DVD drive 2, or HD drive 3) and a graphic controller (not shown) for performing display control on the display data. The image processor 6 displays the display data on the display 7.

The display 7 is, for example, a liquid crystal display of the touch panel form or the like, displays the display data (for example, a map screen, a menu screen, a video screen, or the like), detects depression by the user, and outputs an instruction signal corresponding to an instruction button for performing various instructions depressed to the system controller 8 via the input I/F 8.

The sensor unit 9 has, for example, a speed sensor for detecting speed of the vehicle on the basis of vehicle speed pulses, a direction sensor (gyro sensor) for detecting drive direction of the vehicle by using earth magnetism, an acceleration sensor for detecting acceleration of the vehicle, a distance sensor for detecting travel distance of the vehicle, and the like. The data detected by the sensors (speed data, direction data, acceleration data, travel distance data, and the like) is output to the system controller 8 via the input I/F 8.

The input unit 10 is provided with buttons for performing various instructions. An instruction signal corresponding to an instruction button depressed by the user is output to the system controller 8 via the input I/F 8. The input unit 10 can perform infrared ray communication with a remote controller (not shown) provided with various instruction buttons, receive an instruction signal from the remote controller, and output the instruction signal to the system controller 8 via the input I/F 8.

The microphone 11 collects sound (operation instruction) uttered by the user. The collected sound is, for example, converted by an A (Analog)/D (Digital) converter (not shown) to a digital signal, and the digital signal is output to the system controller 8 via the input I/F 8.

The GPS receiver 12 receives navigation waves output from a GPS satellite disposed on a satellite orbit and revolving around the earth via an antenna (not shown) detects present position information (longitude and latitude) on the basis of the received signal, and outputs the detected information as GPS data to the system controller 8.

The BT receiver 13 is constructed by using, for example, an LSI (Large-Scale Integration) as a main body, has a near field communication function based on the known Bluetooth, and performs the near field communication with another radio communication device employing Bluetooth. The radio communication device can be built in or connected to a cellular phone, PDA (Personal Digital Assistants), a portable music piece player, or the like (or can be used singularly).

In the Bluetooth, a near field communication network whose maximum data transmission speed is about 1 Mbps and whose maximum transmission distance is about 10 m is constructed and data communication is performed. 79 channels having the ISM (Industrial Scientific Medical) frequency band of 2.4 GHz which can be used without permission and having a bandwidth of 1 MHz are set. Electric waves are transmitted/received among electronic devices employing the spectrum spread technique of the frequency hopping method of switching the channel 1,600 times per second. In the Bluetooth, the slave-master method is applied, and devices are divided to a master device (parent device) for determining a frequency hopping pattern and a slave device (child device) as the other communication party controlled by the master device.

In the embodiment, the BT transmitter/receiver 13 is set as a master device, and a radio communication device TA of a user A, a radio communication device TB of a user B, and a radio communication device TC of a user C shown in FIG. 1 are set as slave devices. Any one of the radio communication device TA, the radio communication device TB, and the radio communication device TC serves as a first radio communication device, and another one of them serves as a second radio communication device.

The BT transmitter/receiver 13 as a master device can perform data communication simultaneously with a plural (for example, seven) radio communication devices at a time. The data communication is controlled by the BT transmitter/receiver 13. For example, the frequency is converted so as to perform frequency hopping of 1,600 times per second on the 79 channels divided every one MHz (2.402 GHz to 2.480 GHz), and the data communication is performed on a packet unit basis.

For example, when the BT transmitter/receiver 13 recognizes (finds) a radio communication device TA existing in a communicatable range (for example, within a 10 m radius) (the power-on state of the radio communication device TA), an authenticating process of exchanging the IDs of the BT transmitter/receiver 13 and the radio communication device TA (which are stored in, for example, the BT transmitter/receiver 13 and the radio communication device), recognizing them, after that, generating a random number, and generating a link key (cryptography key) among the master and slave devices is performed. By the authenticating process, radio communication between the master and slave devices is established (connection is established) (similarly also between the radio communication device TB and the radio communication device TC). Once the authenticating process is performed, at the time of connection after that, the radio connection is automatically established between the master and slave devices on the basis of the link key without performing the authenticating process.

The navigation apparatus S also has, although not shown, for example, a VICS (Vehicle Information and Communication System) receiver which can receive FM multiplex broadcasting and road traffic information (for example, information on traffic situation such as traffic jam) generated from an optical (infrared) beacon, an electric wave (quasi-microwave) beacon, or the like mounted on a road (a main arterial road or highway).

The system controller 14 includes a CPU (Central Processing Unit) having the computing function, a RAM for work, and a ROM for storing various data and a program. By reading and executing the program, the CPU of the system controller 14 controls the entire components in the navigation apparatus S in a centralized manner and functions as registering means, presenting means, and the like of this application. The system controller 14 performs navigation (routing search, routing assistance, and the like from the present location to the destination) process, audio recording/reproducing process, and video recording/reproducing process. Since those processes are known, the detailed description will not be given.

The system controller 14 as registering means registers a radio communication device whose radio communication is established as described above.

Registration of a radio communication device denotes storage of identification information (for example, the ID used at the time of generating the link key or, in the where the radio communication device is built in a cellular phone, peculiar number pre-stored in a nonvolatile memory in the cellular phone) of the radio communication device into, for example, a predetermined area in the RAM in the system controller 14 or storage of the flag "1" into a predetermined storage area in the RAM assigned to the radio communication device. Such registration of a radio communication device will be called "login of a radio communication device" or "login of the user of a radio communication device".

In the case where radio communications are established between a plural radio communication devices and the BT transmitter/receiver 13, logins of the plural radio communication devices are performed in the same time zone (plural logins). On the other hand, in the case where the radio communication between the radio communication device and the BT transmitter/receiver 13 is disconnected (for example, when the radio communication device moves out of the communicatable range), registration of the radio communication device is cancelled (for example, the identification information of the radio communication device is erased from the predetermined storage area in the RAM or the flag "0" is stored in the predetermined storage area in the RAM assigned to the radio communication device). Cancellation of the registration of a radio communication device will be called "logout of a radio communication device" or "logout of the user of a radio communication device". A radio communication device may be logged out in response to, for example, a logout instruction from the user (depression of a logout button).

The system controller 14 as the presenting means presents information (data) to the user on the basis of the setting information according to a radio communication device which logs in (that is, is registered).

The content or format of information to be presented to the user of a radio communication device which logs in (for example, information presented to the user by the navigation function or information presented to the user by the audio reproducing and video reproducing function) can be set in accordance with an instruction of the user (for example, depression of a predetermined instruction button in the input unit 10 or the display 7). The set content or format is specified as setting information according to the radio communication device (in other words, peculiar to the user of the radio communication device) and is updatably stored, for example, in an HD.

Examples of the form of information which can be specified as the setting information include a display format of a screen on the display 7 (for example, a setting of one-screen display or two-screen-division display, a setting of map display or television display, and a setting of a map display format (for example, north-up, course-up, or sky-view setting) in the navigation function), a format of sound output from the speaker 5 (for example, known sound field setting (by locking output of sound to the woofer or the sub-woofer, or making sound volume of the speaker 5 on the driver's seat side and that of the speaker 5 on the front-seat passenger seat side different from each other).

Examples of the content of the information which can be specified as the setting information include display content of a screen on the display 7, content of a destination list in the navigation function (for example, a destination set by an instruction of the user), and content of a play (reproduce) list in a music piece reproducing function (a music piece registered as a favorite according to an instruction of the user, a music piece reproduced according to an instruction of the user, a music piece ripped (for example, recorded from a CD to an HD) in accordance with an instruction of the user, or the like).

Further, in the case where radio communication is established with a plural radio communication devices and the plural radio communication devices log in, the system controller 14 places priority on setting information which is common to the radio communication devices (in other words, users) logged in and, on the basis of the setting information, presents the information to the users.

The setting information common to the radio communication devices denotes setting information that specifies the content or format of information which is set or the like in accordance with an instruction of the user (driver or passenger) in a state where the plural radio communication devices log in. For example, the content of a play list registering a music piece (more concretely, the title, ID, and the like of the music piece) reproduced when the user A having the radio communication device TA and the user B having the radio communication device TB ride on and drive the same car (the radio communication device TA and the radio communication device TB log in at the same timing) (for your information, a music piece reproduced when, for example, only the radio communication device TA logs in is registered in another play list) is specified as setting information common to the radio communication device TA and the radio communication device TB (in other words, shared by the user A of the radio communication device TA and the user B of the radio communication device TB), and stored updatably in, for example, an HD.

FIG. 2 is a diagram showing the content of a database (built in, for example, in an HD) stored so that setting information of radio communication devices can be discriminated from each other.

In the database shown in FIG. 2, setting information is stored so as to be associated with identification information of each radio communication device (or a combination of a plural radio communication devices). For example, in the case where the radio communication device TA and the radio communication device TB log in, the system controller 14 obtains any setting information according to preset priority (setting information having highest priority) from setting information 51 for the radio communication device TA, setting information 52 for the radio communication device TB, and setting information 53 common to the radio communication device TA and the radio communication device TB, and presents the information on the basis of the setting information. The system controller 14 employs initial (default) setting on the content or format which is not specified in the setting information.

FIG. 3 is a diagram showing an example of the priority of setting information in the case where the radio communication device TA and the radio communication device TB log in.

In the example shown in FIG. 3, the priority on the setting information common to the radio communication device TA and the radio communication device TB is the highest. The setting information for the radio communication device TA, the setting information for the radio communication device TB, and initial (default) setting information are in the order of descending priorities. The information indicative of such priorities is stored in, for example, an HD so as to be associated with the identification information of the radio communication device TA and the radio communication device TB. Such priorities can be changed by an instruction of the user (for example, priority on the setting information for the radio communication device TA can be set higher than that on the setting information common to the radio communication devices TA and TB). In the case where the radio communication device TA, the radio communication device TB, and the radio communication device TC log in, in the initial settings, the priority on the setting information common to the radio communication device TA, the radio communication device TB, and the radio communication device TC is the highest. The user can change the setting so that the priority on the setting information common to the radio communication device TA and the radio communication device TB becomes the highest.

In a state where a plural radio communication devices log in, in the case where any of the radio communication devices logs out, the system controller 14 switches so as to present information on the basis of the setting information for a radio communication device other than the radio communication device which logged out, or the setting information common to the radio communication devices which log in. For example, in the case where the radio communication device TA, the radio communication device TB, and the radio communication device TC log in and the information is presented on the basis of the setting information common to the radio communication device TA, the radio communication device TB, and the radio communication device TC, when the radio communication device TC logs out, information is presented on the basis of the setting information for the radio communication device TA (or TB) other than the radio communication device TC which logged out or the setting information common to the radio communication device TA and the radio communication device TB which log in (on the basis of the setting information in accordance with the priority at that time).

FIGS. 4A and 4B to FIGS. 6A and 6B show diagrams showing an example of screens displayed on the display 7 in the case where a single radio communication device logs in and in the case where a plural radio communication devices log in.

FIG. 4A shows an example of a screen of a map or the like in the navigation function in the case where the radio communication device TA logs in singularly. FIG. 4B shows an example of a screen of a map or the like in the navigation function in the case where both of the radio communication devices TA and TB log in. The screen format in the case where the radio communication device TA logs in singularly, and that in the case where both of the radio communication device TA and the radio communication device TB log in are different from each other (a 1-screen display and a 2-screen-division display). When a "menu" button 55 shown in FIGS. 4A and 4B is selected and instructed by the user, the screen shifts to a screen for making various settings such as the setting of the screen format or a screen displaying selection items for executing various functions provided for the navigation apparatus S.

Figures 5A, 5B:
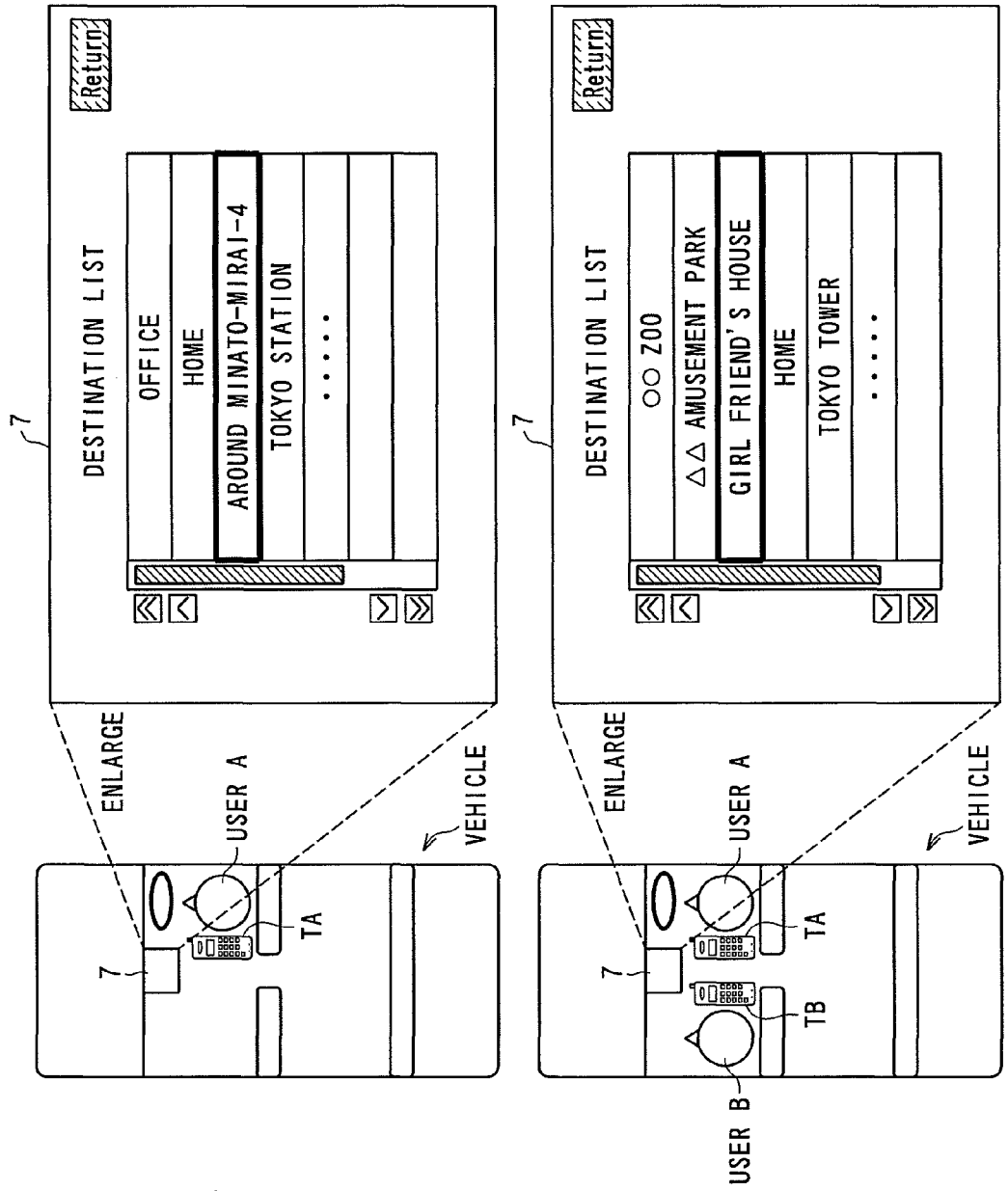

FIG. 5A shows an example of a screen of a destination list in the navigation function in the case where the radio communication device TA logs in singularly. FIG. 5B shows an example of a screen of the destination list in the navigation function in the case where both of the radio communication device TA and the radio communication device TB log in. The content of the destination list in the case where the radio communication device TA logs in singularly, and that in the case where both of the radio communication device TA and the radio communication device TB log in are different from each other. For example, a destination in the destination list shown in FIG. 5A is set by an instruction of the user A in the case where the radio communication device TA logs or logged in singularly at present or in the past. A destination in the destination list shown in FIG. 5B is set by an instruction of the user A or user B in the case where both of the radio communication device TA and the radio communication device TB log or logged in at present or in the past. When a destination displayed in the destination list is selected and instructed by the user, the destination is set, and routing search to the destination is performed.

Figures 6A, 6B:
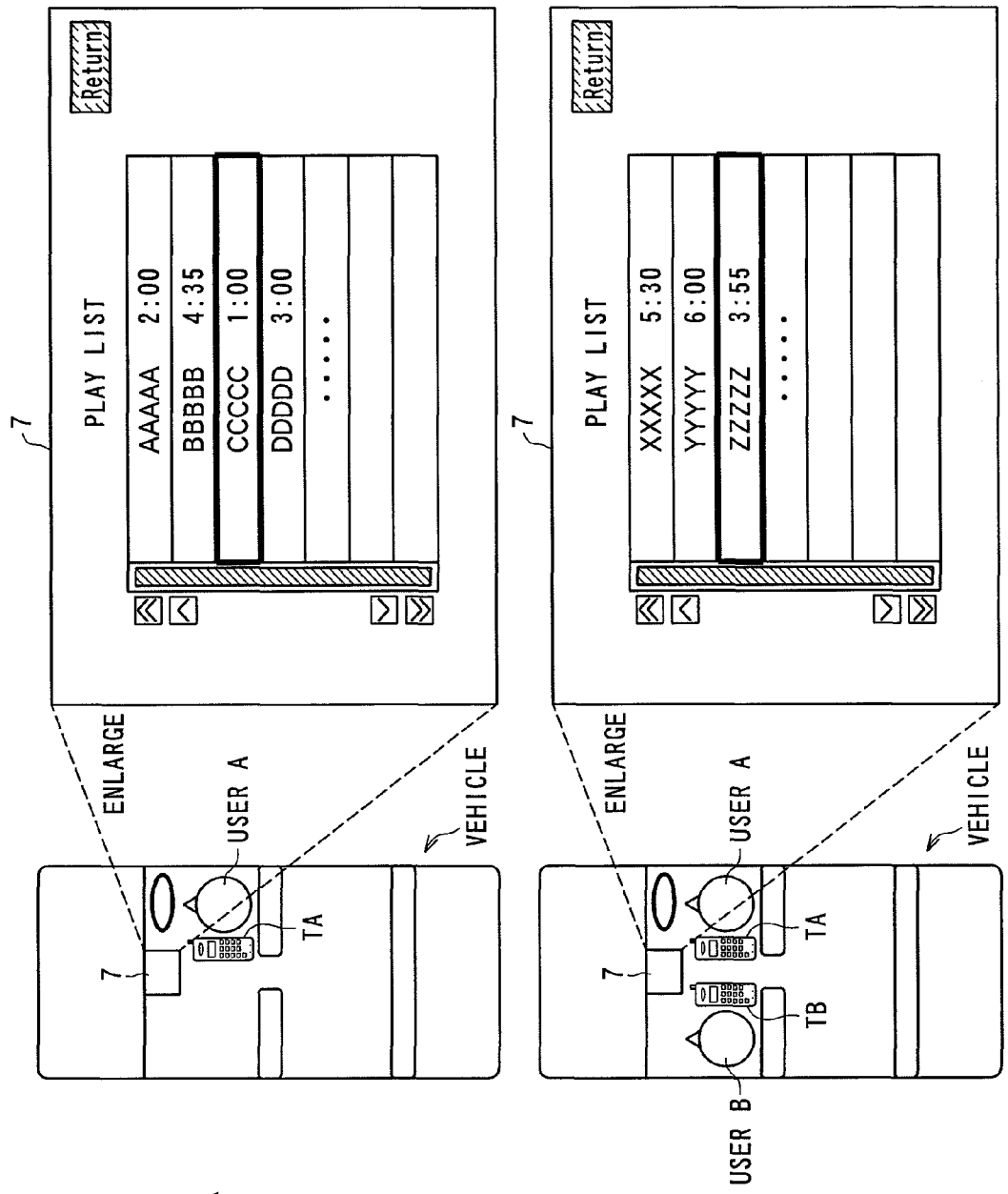

FIG. 6A shows an example of a screen of a play list in a music piece reproducing function in the case where the radio communication device TA logs in singularly. FIG. 6B shows an example of a screen of the play list in the music piece reproducing function in the case where both of the radio communication device TA and the radio communication device TB log in. The content of the play list in the case where the radio communication device TA logs in singularly, and that in the case where both of the radio communication device TA and the radio communication device TB log in are different from each other. For example, a music piece in the play list shown in FIG. 6A is a music piece reproduced (or registered as a favorite) by an instruction of the user A in the case where the radio communication device TA logs or logged in singularly at present or in the past. A music piece in the play list shown in FIG. 6B is a music piece reproduced (or registered as a favorite) by an instruction of the user A or B in the case where both of the radio communication device TA and the radio communication device TB log or logged in at present or in the past. When a music piece (title) displayed in the play list is selected and instructed by the user, the music piece is reproduced.

The operation of the navigation apparatus S of the embodiment will now be described with reference to FIGS. 7 and 8 and the like.

Figure 7:
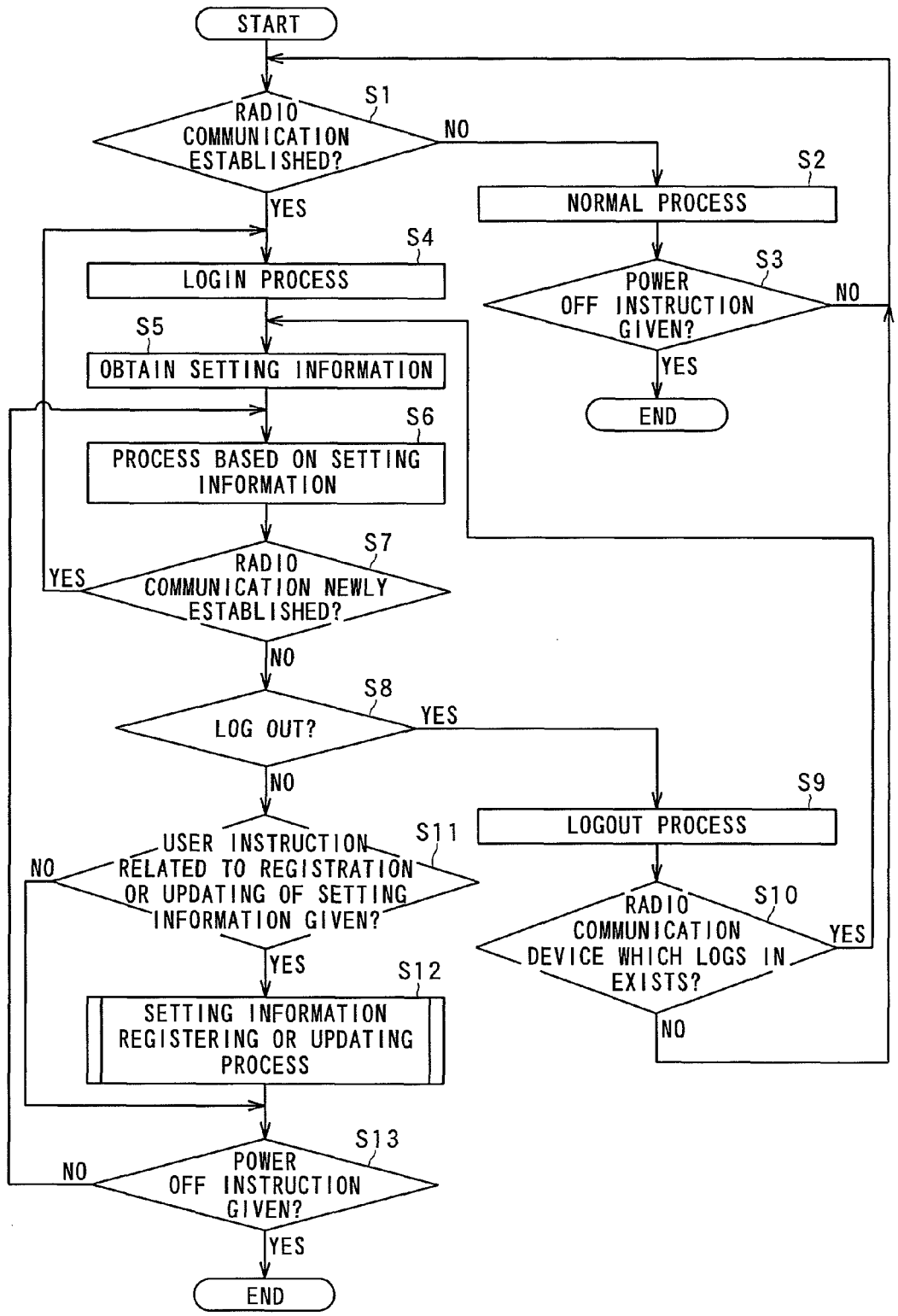
FIG. 7 is a flowchart showing main process in a system controller 14 in a navigation apparatus S as the embodiment of the invention.

FIG. 7 is a flowchart showing main process in the system controller 14 in the navigation apparatus S as the embodiment. FIG. 8 is a flowchart showing setting information registering or updating process in FIG. 7.

A main process shown in FIG. 7 is started, for example, when the power source of the navigation apparatus S is turned on. First, the system controller determines whether radio communication is established between the BT transmitter/receiver 13 and the radio communication device or not (step S1). In the case where the radio communication is not established (N in step S1), normal process is performed (step S2). Subsequently, the system controller 14 determines whether a power off instruction is given or not (step S3). In the case where the power off instruction is given (Y in step S3), the process is finished. In the case where there is no power off instruction (N in step S3), the system controller 14 returns to step S1 and processes similar to the above are performed. The above-described normal process is a general information presenting process which does not require login of a radio communication device, and a screen display and the like is performed according to default settings.

On the other hand, in the case where the BT transmitter/receiver 13 finds a radio communication device (in the power on state) existing in the communicatable range (for example, a radius of 10 m) and establishes radio communication with the BT transmitter/receiver 13 as described above, the system controller 14 recognizes establishment of the radio communication (Y in step S1), and executes a login process on the radio communication device with which the radio communication is established (step S4). In the login process, the system controller 14 stores, for example, identification information of the radio communication device TA with which the radio communication is established into a predetermined storage area in the RAM (or the flag "1" may be stored in the predetermined storage area in the RAM assigned to the radio communication device). It completes the login of the radio communication device TA.

Subsequently, the system controller 14 obtains setting information for the radio communication device TA which logs in (the setting information associated with the identification information of the radio communication device TA) from an HD via the HD drive 3 (reads and develops it to a RAM) (step S5).

In the process based on the setting information in step S6, various processes according to an instruction of the user (navigation process, audio recording/reproducing process, video recording/reproducing process, and the like) are performed. At this time, on the basis of the setting information obtained, the information is presented as described above.

Subsequently, the system controller 14 determines whether or not radio communication is newly established between the BT transmitter/receiver 13 and another radio communication device (step S7). In the case where establishment of new radio communication is recognized (Y in step S7), the system controller 14 shifts to step S4, and executes the login process on a radio communication device with which the radio communication is established. In the login process, the system controller 14 stores, for example, the identification information of the radio communication device TB with which the radio communication is established into the predetermined storage area in the RAM. It completes login of the radio communication device TB. Another configuration may be also employed such that the user preliminarily registers the identification information of an arbitrary radio communication device in a login permission list in the navigation apparatus S, and the system controller 14 permits only radio communication devices registered in the login permission list to log in.

Subsequently, the system controller 14 obtains any setting information according to preset priority (setting information having highest priority) from setting information for the radio communication device TB which newly logged in, setting information for the radio communication device TA already logged in, and setting information common to the radio communication device TA and the radio communication device TB from the HD via the HD drive 3 (reads and develops the information to the RAM) (step S5). In such a manner, for example, the setting information common to the radio communication device TA having the highest priority and the radio communication device TB is obtained (setting information is re-obtained). On the basis of the obtained setting information, the information is presented as described above.

On the other hand, in the case where new radio communication is not established (N in step S7), the system controller 14 determines whether the radio communication device which logs in is to be logged out or not (step S8). In the case where logout is performed (for example, a logout instruction is received from the user or radio communication with the BT transmitter/receiver 13 is disconnected) (Y in step S8), the system controller 14 executes a logout process on the radio communication device (step S9). In the logout process, the system controller 14 specifies, for example, a radio communication device to be logged out, and erases the identification information of the radio communication device from the predetermined storage area in the RAM. It completes logout of the radio communication device.

Subsequently, the system controller 14 determines whether a radio communication device which still logs in or not (for example, determines whether the identification of a radio communication device is stored in the RAM or not) (step S10). In the case where a radio communication device which still logs in exists (Y in step S10), the system controller 14 shifts to step S5 and obtains setting information for the radio communication device which still logs in (or in the case where a plural radio communication devices still log in, setting information having the highest priority and common to the plural radio communication devices) (re-obtains setting information). On the basis of the obtained setting information, the system controller 14 presents the information as described above (switches the information presenting format or content of the presentation).

On the other hand, in the case where it is determined in the step S10 that a radio communication device which logs in does not exist (N in step S10), the system controller 14 returns to step S1, and processes similar to the above are executed.

On the other hand, in the case where the system controller 14 determines that a radio communication device is not logged out in the step S8 (N in step S8), whether a user instruction on registration or updating of setting information is given or not is determined (step S11). Examples of the user instruction on registration or updating of setting information include, as described above, an instruction to set a screen display format, a sound field setting instruction, a destination setting instruction, a favorite music piece registering instruction, a music piece reproducing instruction, and a music piece ripping instruction. Since a known example can be applied, the details of the case where the user gives those instructions will not be described.

In the case where a user instruction on registration or updating of setting information is given (in this case, data indicative of the content or format of information which is set or the like by the instruction of the user is temporarily stored in, for example, a specific area in the RAM) (Y in step S11), the system controller 14 executes setting information registering or updating process (which will be described later) (step S12). In the case where there is no user instruction on registration or updating of setting information (N in step S11), the system controller 14 shifts to step S13.

In step S13, whether a power off instruction is given or not is determined. In the case where a power off instruction is given (Y in step S13), the process is finished. In the case where there is no power off instruction (N in step S13), the shift controller 14 returns to step S6, and processes similar to the above are performed.

Figure 8:
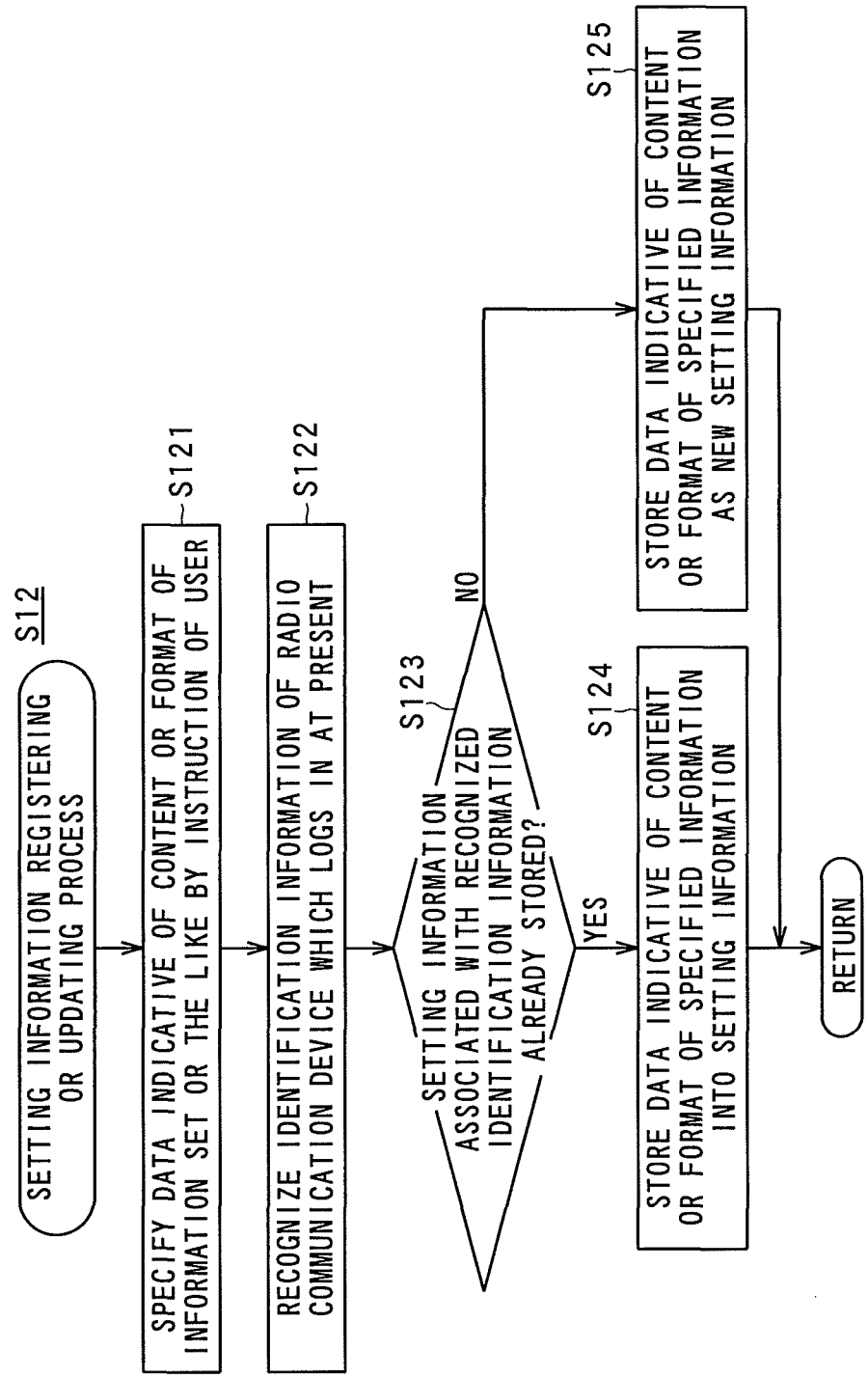
FIG. 8 is a flowchart showing processes of registering or updating setting information in FIG. 7.

In the setting information registering or updating process in step S12, as shown in FIG. 8, the system controller 14 first specifies data indicative of the content or format of information which is set or the like by the instruction of the user (step S121).

Subsequently, the system controller 14 recognizes the identification information of the radio communication device which logs in at present (step S122) and determines whether setting information associated with the recognized identification information (for example, in the case where two radio communication devices log in, setting information (for example, the setting information 53 shown in FIG. 2) associated with the combination of the identification information of the two radio communication devices) is already stored or not (step S123).

In the case where the setting information associated with the recognized identification information is already stored (Y in step S123), the system controller 14 stores the data indicative of the content or format of the specified information into the setting information (both of the setting information in the database in the HD and the setting information expanded in the RAM in step S5) (for example, adds and registers (stores) the data (for example, data indicative of a destination or the like) or rewrites to the data (for example, data indicative of the display format of the screen) and registers (stores) it) (step S124), and returns the process shown in FIG. 7.

On the other hand, in the case where the setting information associated with the recognized identification information is not stored yet (N in step S123), the system controller 14 stores the data indicative of the content or format of the specified information so as to be associated with the recognized identification information as new setting information (step S125) and returns to the process shown in FIG. 7.

The data indicative of the content or format of the information which is set or the like in accordance with the instruction of the user, which is temporarily stored in the specific area in the RAM is erased, for example, after the process of step S124 or S124.

As described above, in the foregoing embodiment, the navigation apparatus S stores setting information that specifies content or format of information to be presented to a user into a database so that it can be distinguished for each of the plural radio communication devices, in the case where radio communication is established with a plural radio communication devices and the plural radio communication devices log in, obtains setting information common to the radio communication devices which log in from the database, and presents information on the basis of the obtained setting information. Consequently, the navigation apparatus S can extract common information according to a combination of users which log in simultaneously using radio communication devices (customized by the users) from a large amount of information which can be provided without allowing the common information to be buried in the large amount of information, and preferentially present (display) the common information (or output sound). Therefore, convenience (usability) for the users can be improved, searchability can be improved, and troubles such as re-setting (changing) according to users existing in the place can be reduced. Information (for example, personal information of the user) of a user who does not log in is not presented (as long as the user does not give up his/her radio communication device), so that the personal information of each of users can be prevented from being leaked in the place where the user is not present.

In the case where the content or format of information to be presented to users is set or the like in a state where a plural radio communication devices log in, the content or format of the information which is set or the like is stored as setting information common to the radio communication devices (that is, the content based on instructions of users when a plural radio communication devices log in is stored (left) as setting information). When the same combination of the users log in later, the common information according to the combination of the users is preferentially presented on the basis of the stored setting information (in other words, operation history in the past). Consequently, memories and the like common to the users can be made clear.

Further, in the case where a plural radio communication devices log in, information is presented on the basis of setting information according to a preset priority from setting information according to each of radio communication devices which log in, and setting information common to the radio communication devices which log in. Thus, information based on, for example, setting information having the highest priority in a large amount of information which can be provided can be presented. Since the priority can be set so that it can be arbitrarily changed. Thus, convenience (usability) can be further improved.

Further, in a state where a plural radio communication devices log in, in the case where any of the radio communication devices logs out (for example, the user having the radio communication device gets off from a vehicle), information is switched so as to be presented on the basis of setting information for a radio communication devices which log in other than the radio communication devices which log out, or setting information common to the radio communication devices which log in. Consequently, information can be automatically switched so that information according to users other than the user who logged out. Convenience (usability) is improved further, and troubles of resetting (changing) of setting can be reduced.

In the foregoing embodiment, an example of the case where each of a plural users log in using a radio communication device has been described. As another example, a single user having a plural radio communication devices may properly use the radio communication devices in accordance with business, situation, use or the like at each time. For example, the user logs in using the radio communication device TA at the time of using a vehicle for dating, logs in using the radio communication device TB at the time of using the vehicle for work, and logs in the radio communication device TC at the time of using the vehicle with a plural friends.

In the foregoing embodiment, setting information having highest priority which is preset is obtained and information is presented on the basis of the obtained. As another example, in the case where a plural radio communication devices log in, on the basis of all of setting information including setting information for the radio communication devices which log in and setting information common to the radio communication devices which log in, information is presented according to priorities set for the setting information. With the configuration, convenience can be further improved.

An embodiment of this case will be described using FIG. 9 and FIGS. 10A to 10D. FIG. 9 and FIGS. 10A to 10D are diagrams each showing an example of a screen of a play list in which information (titles and the like) on music pieces is displayed on the basis of all of setting information for radio communication devices which log in and in accordance with priorities set for the setting information. As the preconditions in this case, as shown in FIG. 3, the radio communication device TA and the radio communication device TB log in, the first (highest) priority on the setting information is placed on the setting information common to the radio communication device TA and the radio communication device TB, the second priority is placed on the setting information for the radio communication device TA, the third priority is placed on the setting information for the radio communication device TB, and the fourth priority is placed on the initial (default) setting information (the priorities can be changed by an instruction of the user). In step S5 in FIG. 7 in this case, the setting information on all of radio communication devices which log in (for example, the setting information for the radio communication device TA, the setting information for the radio communication device TB, and the setting information common to the radio communication device TA and the radio communication device TB) is obtained from an HD (read and developed to an RAM).

Figure 9:
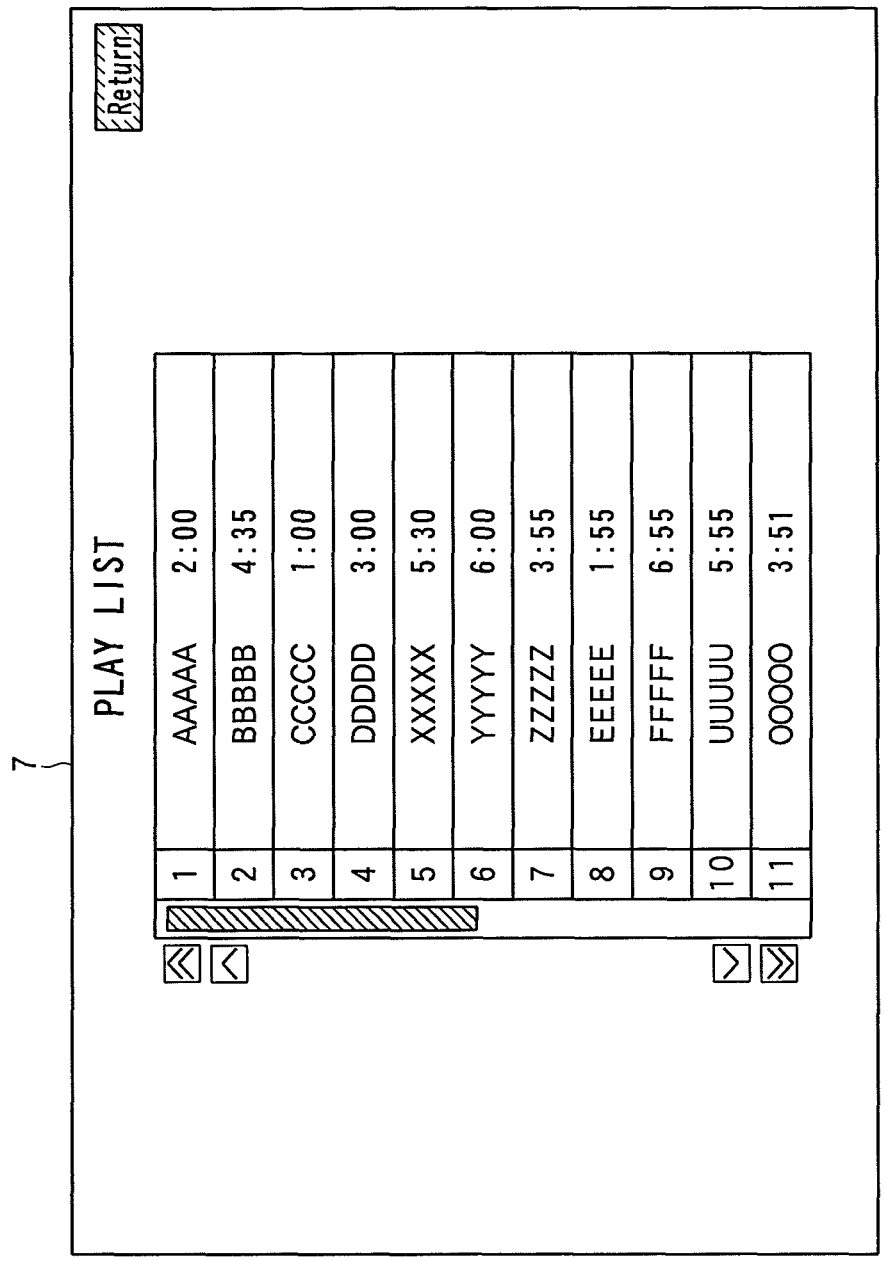
FIG. 9 is a diagram showing an example of a screen of a play list displaying information on music pieces on the basis of all of setting information on radio communication devices which log in and in accordance with the priority which is set in each of the setting information.

In the example of the screen of the play list shown in FIG. 9, information on a plural music pieces (AAAAA, BBBBB, CCCCC, and DDDDD) specified by the setting information common to the radio communication device TA and the radio communication device TB is positioned in the highest order (that is, in the position where the user can easily grasp, select, and instruct the information). Information on a plural music pieces (XXXX, YYYYY, and ZZZZZ) specified by the setting information for the radio communication device TA is positioned next. Information on a plural music pieces (FFFFF, EEEEE, and UUUUU) specified by the setting information for the radio communication device TB is positioned next. Finally, information (ooooo) related to other music pieces (a large volume of music pieces which are recorded on the HD but are not specified by any of the setting information) is positioned (for example, a position in which the information cannot be grasped if the screen is not scrolled to display the information).

Figure 10A:
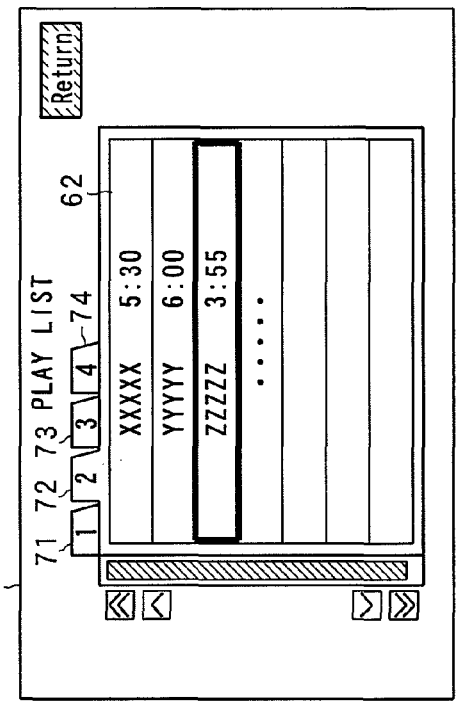
FIGS. 10A, 10B, 10C, and 10D are diagrams showing an example of a screen of a play list displaying information on music pieces on the basis of all of setting information on radio communication devices which log in and in accordance with the priority which is set in each of the setting information.
Figure 10B:
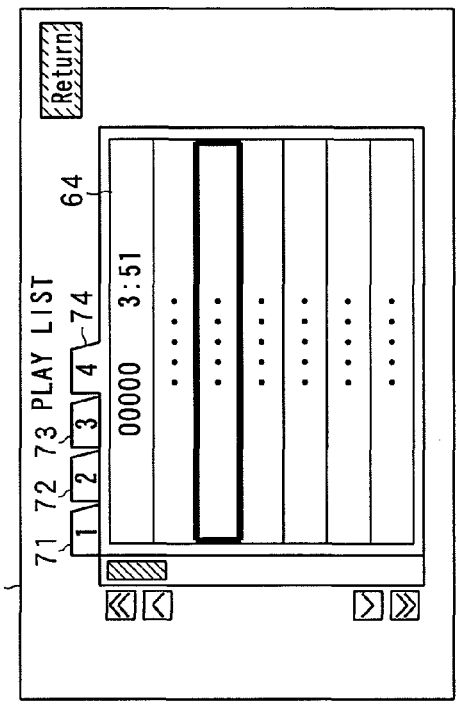
Figure 10C:
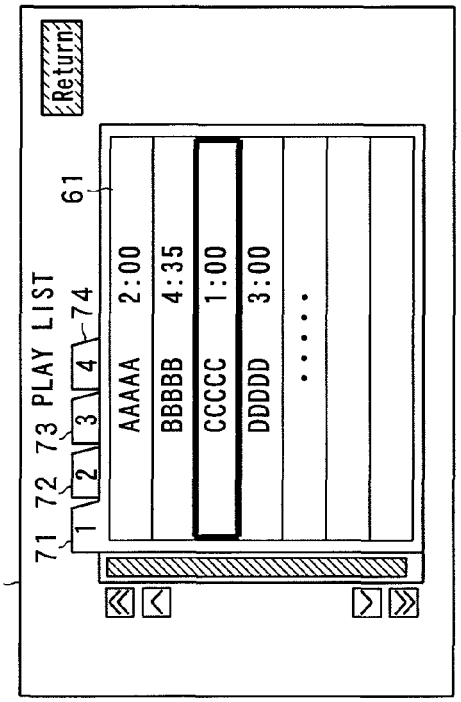
Figure 10D:
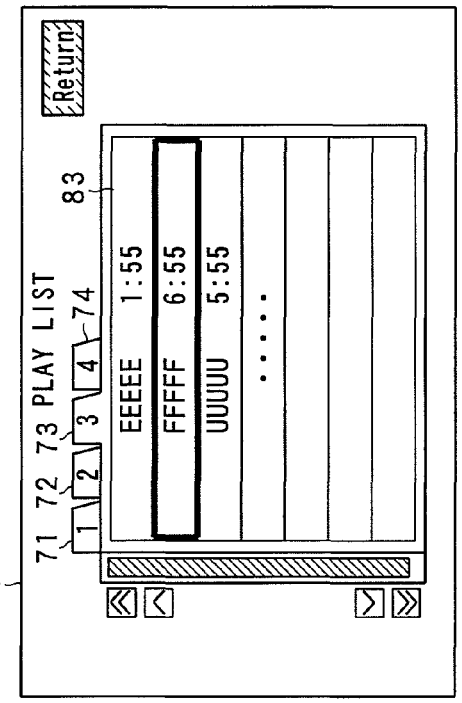

On the other hand, in the example of the screen of the play list shown in FIGS. 10A to 10D, a play list 61 displaying information on a plural music pieces specified by the setting information common to the radio communication device TA and the radio communication device TB, a play list 62 displaying information on a plural music pieces specified by the setting information for the radio communication device TA, a play list 63 displaying information on a plural music pieces specified by the setting information for the radio communication device TB, and a play list 64 displaying information on the other music pieces can be switched by switch buttons (tabs) 71 to 74 and the switched list can be displayed. At the stage of the initial display of the screen, the play list 61 is displayed preferentially as shown in FIG. 10A. The switch buttons (tabs) 71 to 74 corresponding to the play lists 61 to 64, respectively, are displayed side by side according to the priorities of the setting information. For example, when the user operates the input unit 10 to select and instruct the switch button 72 in the display state shown in FIG. 10A, the play list 62 is displayed as shown in FIG. 10B. When the user selects and instructs the switch button 73, the play list is displayed as shown in FIG. 10C. When the user selects and instructs the switch button 74, the play list is displayed as shown in FIG. 10D. As another example, the play lists 61 to 64 may be displayed on a single screen, and the areas of the display regions of the play lists to 64 may be divided so as to be varied according to the priorities (for example, the areas of the display regions of the play lists 64, 63, 62, and 61 are in descending order).

Although the embodiment has been described using the play lists as an example, the invention is not limited to the play lists. The present invention can be similarly applied to, for example, destination lists in the navigation function.

As described with reference to FIG. 9 and FIGS. 10A to 10D, information (information related to music pieces) is presented on the basis of all of the setting information including the setting information for radio communication devices which log in and the setting information common to the radio communication devices which log in and in accordance with the priorities which are set for the setting information. With the configuration, for example, the information related to music pieces according to users who logged in simultaneously using radio communication devices can be presented step by step in accordance with the priories on the setting information. Further, the users which log in at present can show their information based on the setting information at the time of login of the users each other and compare the information (for example, the music pieces listened on the playlists when each user logs in).

The foregoing embodiment has been described that a radio communication device logs in when the radio communication is established between radio communication devices and the BT transmitter/receiver 13 (that is, the radio communication device logs out when the radio communication is disconnected). As another example, even when a radio communication device performs radio communication once with the BT transmitter/receiver 13 and logs in and, immediately after that, the radio communication is disconnected, the system controller 14 recognizes so as to maintain the login state of the radio communication device. For example, only after a logout instruction (depression of a logout button) is given from the user, a process of logging out the radio communication device may be performed.

As the radio communication device, another radio communication device employing Bluetooth has been described above. However, the invention is not limited to the example. For example, a radio communication device employing infrared light, a radio standard capable of realizing wide-range throughput such as 802.11b or IEEE802.11e, or a radio standard according to a diffusion-type radio communication called PlusOn technology can be also applied. As the radio communication device, a known IC tag, IC card, or the like can be also applied.

Although examples of "information presented on the basis of setting information" have been variously described in the foregoing embodiments, the invention is not limited to the examples but can be applied to various information without departing from the gist of the present invention. For example, the invention can be applied to photographic image data registered by a user who logs in, and the like.

When a specific radio communication device logs in, the content or format of information to be provided may be preliminarily specified in setting information. For example, in setting information for a radio communication device used by a user (for example, mother of the driver) who is not good at handling various functions of the navigation apparatus S, it is preliminarily specified to display only buttons for executing the minimum functions (for example, a button related to the music piece reproducing function) on the screen so that the user can easily operate the navigation apparatus S.

In the case where a certain combination of plural radio communication devices log in, it may be preliminarily specified in setting information so that some event occurs (for example, at the time of login, specific music is reproduced, sound of a guide in the navigation function changes, or the like).

In the foregoing embodiments, the examples of the case of applying the information presenting apparatus and the like of the present application to an in-vehicle navigation/AV apparatus have been described. However, the invention is not limited to the examples. The invention can be also applied to AV devices and audio devices for vehicle, for household, and for business, general personal computers, and the like.

The invention claimed is:

1. An information outputting apparatus capable of performing radio communication with a plurality of radio communication devices, comprising:
    a storing device which stores setting information specifying content or format of information to be output on the information outputting apparatus to users of the plurality of radio communication devices, so that the setting information for the plurality of radio communication devices is distinguished from each other;
    a registering device which registers the plurality of the radio communication devices with which radio communication is established; and
    an outputting device which outputs the content or format of the information on the information outputting apparatus on a basis of the setting information for the registered plurality of radio communication devices,
    wherein when radio communication is established with the plurality of radio communication devices and the plurality of radio communication devices are registered, the outputting device outputs the content or format of the information on the information outputting apparatus on the basis of the setting information,
    wherein the setting information being common to the registered plurality of radio communication devices, and
    wherein, at the output of the content or format of the information on the information outputting apparatus, the setting information itself is not outputted on both of the information outputting apparatus and the radio communication devices respectively.

2. The information outputting apparatus according to claim 1,
    wherein in the case where radio communication with the plurality of radio communication devices is established and the plurality of radio communication devices are registered, the outputting device outputs the content or format of the information on the information outputting apparatus on the basis of any of the setting information according to preset priorities among first setting information for a first radio communication device registered, second setting information for a second radio communication device registered, and the setting information being common to the radio communication devices registered.

3. The information outputting apparatus according to claim 1,
    wherein in the case where radio communication with the plurality of radio communication devices is established and the plurality of radio communication devices are registered, the outputting device outputs the content or format of the information on the information outputting apparatus on the basis of all of setting information of first setting information for a first radio communication device registered, second setting information for a second radio communication device registered, and setting information being common to the radio communication devices registered and in accordance with priorities set for the setting information.

4. The information outputting apparatus according to claim 1,
wherein in the case where the content or format of the information is set in a state where radio communication with the plurality of radio communication devices is established and the plurality of radio communication devices are registered, the storing device stores the set content or format of the information as the setting information being common to the radio communication devices.

5. The information outputting apparatus according to claim 1,
wherein in the case where registration of any of the radio communication devices is cancelled in a state where radio communication with the plurality of radio communication devices is established and the plurality of radio communication devices are registered, the outputting device which switches so as to output the content or format of the information on the basis of the setting information for the registered radio communication device other than the radio communication device whose registration is cancelled, or the setting information being common to the radio communication devices registered.

6. An information outputting method executed in the an information outputting apparatus for performing radio communication with a plurality of radio communication devices, comprising:
   a storing process of storing setting information specifying content or format of information to be output on the outputting apparatus to users of the plurality of radio communication devices, so that the setting information for the plurality of radio communication devices is distinguished from each other;
   a registering process of registering the plurality of radio communication devices with which radio communication is established; and
   an outputting process of outputting the content or format of the information on the outputting apparatus on a basis of the setting information for the registered plurality of radio communication devices,
   wherein in the outputting process, when radio communication is established with the plurality of radio communication devices and the registered plurality of radio communication devices, the content or format of information is output on the outputting apparatus on the basis of the setting information, the setting information being common to the radio communication devices registered, and
   wherein, at the output of the content or format of information on the information outputting apparatus, the setting information itself is not outputted on both of the information outputting apparatus and the radio communication devices respectively.

7. A non-transitory computer-readable storage medium having stored thereon a computer-executable information output processing program enabling a computer for performing radio communication with a plurality of radio communication devices to perform the method, comprising:
   storing setting information specifying content or format of information to be output on the information outputting apparatus to users of the plurality of radio communication devices, so that the setting information for the plurality of radio communication devices is distinguished from each other;
   registering the plurality of radio communication devices with which radio communication is established; and
   outputting the content or format of information on the information outputting apparatus on a basis of the setting information for the registered plurality of radio communication devices,
   wherein when radio communication is established with the plurality of radio communication devices and the registered plurality of radio communication devices, the content or format of information is output on the information outputting apparatus on the basis of the setting information, the setting information being common to the radio communication devices registered, and
   wherein, at the output of the content or format of information on the information outputting apparatus, the setting information itself is not outputted on both of the information outputting apparatus and the radio communication devices respectively.

* * * * *